United States Patent
Cheng et al.

(10) Patent No.: US 11,956,120 B2
(45) Date of Patent: Apr. 9, 2024

(54) INDICATING SIDELINK CONNECTION LOSS

(71) Applicant: QUALCOMM Incorporated, San Diego, CA (US)

(72) Inventors: Hong Cheng, Basking Ridge, NJ (US); Sudhir Kumar Baghel, Hillsborough, NJ (US); Kapil Gulati, Belle Mead, NJ (US); Dan Vassilovski, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 16/948,662

(22) Filed: Sep. 28, 2020

(65) Prior Publication Data

US 2021/0099338 A1 Apr. 1, 2021

Related U.S. Application Data

(60) Provisional application No. 62/908,394, filed on Sep. 30, 2019.

(51) Int. Cl.
| | |
|---|---|
| *H04L 41/0686* | (2022.01) |
| *H04W 72/04* | (2023.01) |
| *H04W 76/27* | (2018.01) |

(52) U.S. Cl.
CPC ......... *H04L 41/0686* (2013.01); *H04W 72/04* (2013.01); *H04W 76/27* (2018.02)

(58) Field of Classification Search
CPC .. H04L 41/0686; H04W 76/27; H04W 72/04; H04W 72/042; H04W 72/0413; H04W 72/0406; H04W 76/14
See application file for complete search history.

(56) References Cited

U.S. PATENT DOCUMENTS

| | | |
|---|---|---|
| 2015/0215981 A1 | 7/2015 | Patil et al. |
| 2017/0127251 A1 | 5/2017 | Yi et al. |
| 2017/0150490 A1 | 5/2017 | Chen et al. |
| 2018/0034683 A1 | 2/2018 | Li et al. |
| 2018/0279275 A1* | 9/2018 | Chen ..................... H04W 76/14 |

(Continued)

FOREIGN PATENT DOCUMENTS

| | | |
|---|---|---|
| WO | 2011038243 A2 | 3/2011 |
| WO | 2014117854 A1 | 8/2014 |

(Continued)

OTHER PUBLICATIONS

U.S. Appl. No. 62/754,556 (Year: 2018).*

(Continued)

*Primary Examiner* — Rushil P. Sampat
(74) *Attorney, Agent, or Firm* — Harrity & Harrity, LLP

(57) ABSTRACT

Various aspects of the present disclosure generally relate to wireless communication. In some aspects, a user equipment (UE) may transmit a first message identifying a set of UEs comprising one or more other UEs with which the UE is engaging in sidelink communication. The UE may transmit a second message, based at least in part on a determination of a loss of a sidelink connection to a previously-connected UE of the set of UEs, identifying a subset of the set of UEs and indicating the loss of the sidelink connection. Numerous other aspects are provided.

30 Claims, 6 Drawing Sheets

(56) References Cited

U.S. PATENT DOCUMENTS

| | | | | |
|---|---|---|---|---|
| 2018/0368191 | A1* | 12/2018 | Vutukuri | H04W 76/14 |
| 2019/0274121 | A1 | 9/2019 | Wu et al. | |
| 2019/0387446 | A1* | 12/2019 | Xu | H04W 36/0016 |
| 2019/0394786 | A1* | 12/2019 | Parron | H04L 27/0006 |
| 2020/0154511 | A1* | 5/2020 | Pan | H04W 76/40 |
| 2021/0219110 | A1* | 7/2021 | Kousaridas | H04W 4/40 |
| 2022/0124678 | A1* | 4/2022 | Lee | H04W 76/18 |

FOREIGN PATENT DOCUMENTS

| | | | |
|---|---|---|---|
| WO | 2018228569 | A1 | 12/2018 |
| WO | 2019028769 | A1 | 2/2019 |
| WO | WO 2020/011415 | A1 * | 1/2020 |

OTHER PUBLICATIONS

"3rd Generation Partnership Project, Technical Specification Group Radio Access Network, Evolved Universal Terrestrial Radio Access (E-UTRA), Radio Resource Control (RRC), Protocol Specification (Release 15)", 3GPP Standard Technical Specification, 3GPP TS 36.331, RAN WG2, V15.7.0, Sep. 27, 2019, pp. 1-962, XP051785031, Retrieved from the Internet: URL: http://ftp.3gpp.org/Specs/archive/36_series/36.331/36331-f70.zip. 36331-f7O.docx.

"3rd Generation Partnership Project; Technical Specification Group Services and System Aspects; Proximity-Based Services (ProSe); Stage 2 (Release 15)", 3GPP Standard, Technical Specification, 3GPP TS 23.303, 3rd Generation Partnership Project (3GPP), Mobile Competence Centre, 650, Route Des Lucioles, F-06921 Sophia-Antipolis Cedex, France, V15.1.0, Jun. 30, 2018 (Jun. 30, 2018), pp. 1-130, XP051472857, Retrieved from the Internet: URL: https://www.3gpp.org/ftp/Specs/archive/23_series/23.303/23303-f10.zip. [retrieved on May 5, 2021], The whole document, sections 4.5.1.1.2.3.3 and 4.6.4.10.

International Search Report and Written Opinion—PCT/US2020/070592—ISA/EPO—dated Jan. 19, 2021.

* cited by examiner

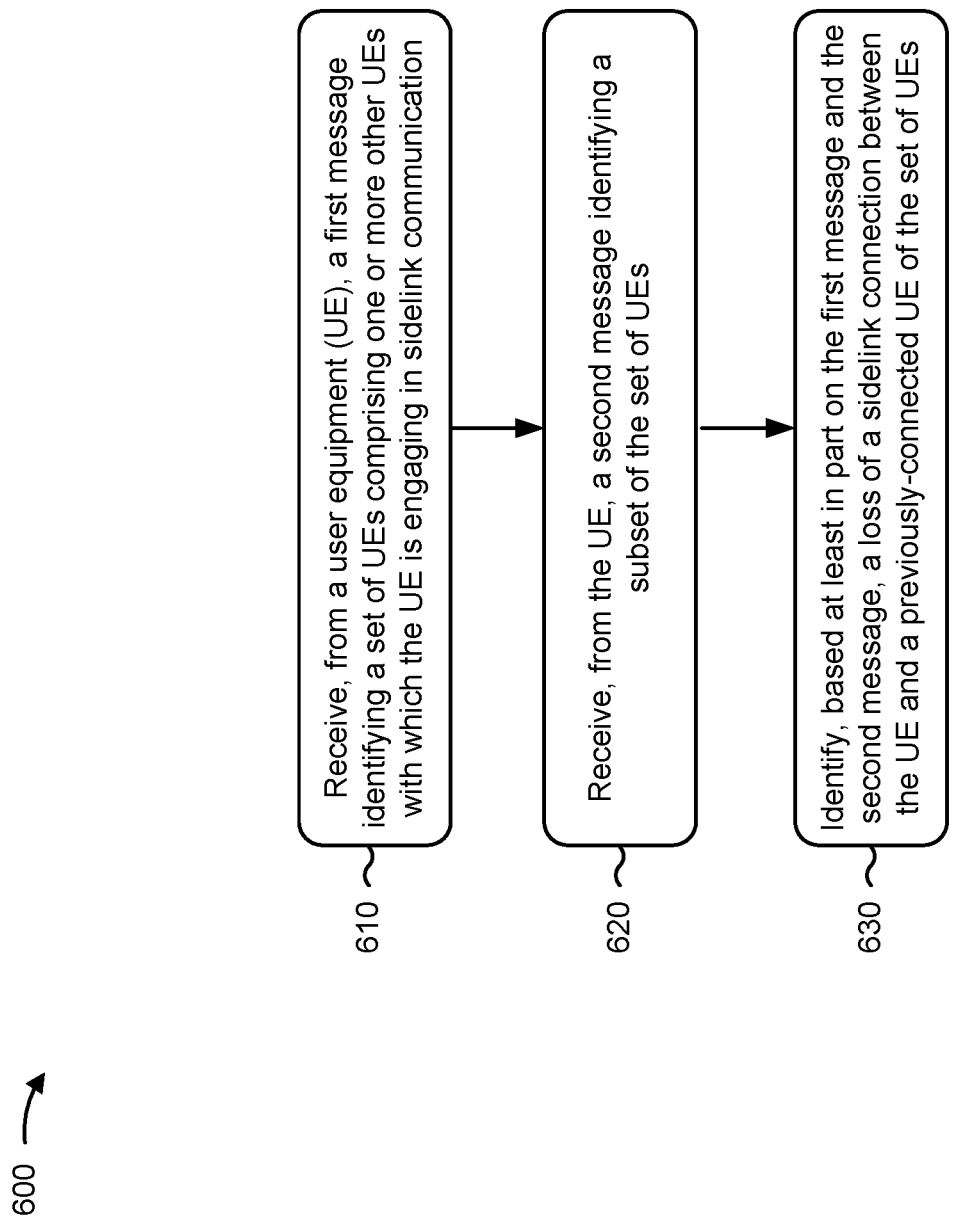

INDICATING SIDELINK CONNECTION LOSS

CROSS-REFERENCE TO RELATED APPLICATION

This patent application claims priority to U.S. Provisional Patent Application No. 62/908,394, filed on Sep. 30, 2019, entitled "INDICATING SIDELINK CONNECTION LOSS," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for indicating sidelink connection loss.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include transmitting a first message identifying a set of UEs comprising one or more other UEs with which the UE is engaging in sidelink communication; and transmitting a second message, based at least in part on a determination of a loss of a sidelink connection to a previously-connected UE of the set of UEs, identifying a subset of the set of UEs and indicating the loss of the sidelink connection.

In some aspects, a method of wireless communication, performed by a base station, may include receiving, from a UE, a first message identifying a set of UEs comprising one or more other UEs with which the UE is engaging in sidelink communication; receiving, from the UE, a second message identifying a subset of the set of UEs; and identifying, based at least in part on the first message and the second message, a loss of a sidelink connection between the UE and a previously-connected UE of the set of UEs.

In some aspects, a UE for wireless communication may include memory and one or more processors coupled to the memory. The memory and the one or more processors may be configured to transmit a first message identifying a set of UEs comprising one or more other UEs with which the UE is engaging in sidelink communication; and transmit a second message, based at least in part on a determination of a loss of a sidelink connection to a previously-connected UE of the set of UEs, identifying a subset of the set of UEs and indicating the loss of the sidelink connection.

In some aspects, a base station for wireless communication may include memory and one or more processors coupled to the memory. The memory and the one or more processors may be configured to receive, from a UE, a first message identifying a set of UEs comprising one or more other UEs with which the UE is engaging in sidelink communication; receive, from the UE, a second message identifying a subset of the set of UEs; and identify, based at least in part on the first message and the second message, a loss of a sidelink connection between the UE and a previously-connected UE of the set of UEs.

In some aspects, a non-transitory computer-readable medium may store one or more instructions for wireless communication. The one or more instructions, when executed by one or more processors of a UE, may cause the one or more processors to: transmit a first message identifying a set of UEs comprising one or more other UEs with which the UE is engaging in sidelink communication; and transmit a second message, based at least in part on a determination of a loss of a sidelink connection to a previously-connected UE of the set of UEs, identifying a subset of the set of UEs and indicating the loss of the sidelink connection.

In some aspects, a non-transitory computer-readable medium may store one or more instructions for wireless communication. The one or more instructions, when executed by one or more processors of a base station, may cause the one or more processors to: receive, from a UE, a first message identifying a set of UEs comprising one or more other UEs with which the UE is engaging in sidelink communication; receive, from the UE, a second message identifying a subset of the set of UEs; and identify, based at least in part on the first message and the second message, a loss of a sidelink connection between the UE and a previously-connected UE of the set of UEs.

In some aspects, an apparatus for wireless communication may include means for transmitting a first message identifying a set of UEs comprising one or more other UEs with which the apparatus is engaging in sidelink communication; and means for transmitting a second message, based at least in part on a determination of a loss of a sidelink connection to a previously-connected UE of the set of UEs, identifying a subset of the set of UEs and indicating the loss of the sidelink connection.

In some aspects, an apparatus for wireless communication may include means for receiving, from a UE, a first message identifying a set of UEs comprising one or more other UEs with which the UE is engaging in sidelink communication; means for receiving, from the UE, a second message identifying a subset of the set of UEs; and means for identifying, based at least in part on the first message and the second message, a loss of a sidelink connection between the UE and a previously-connected UE of the set of UEs.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example process performed, for example, by a base station, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, specific structures and/or functions described herein are to facilitate the disclosure of various aspects of implementations described herein. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
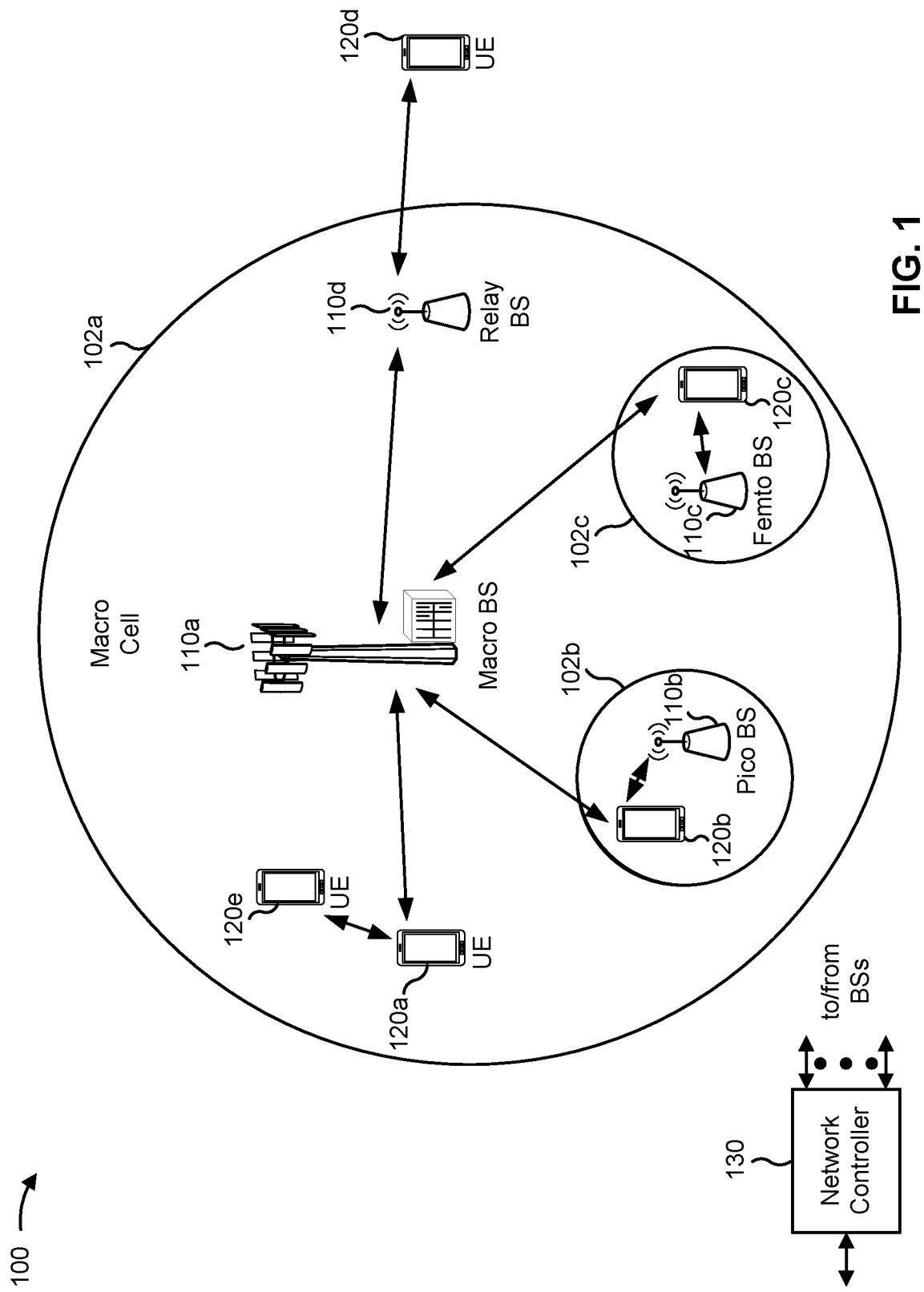
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
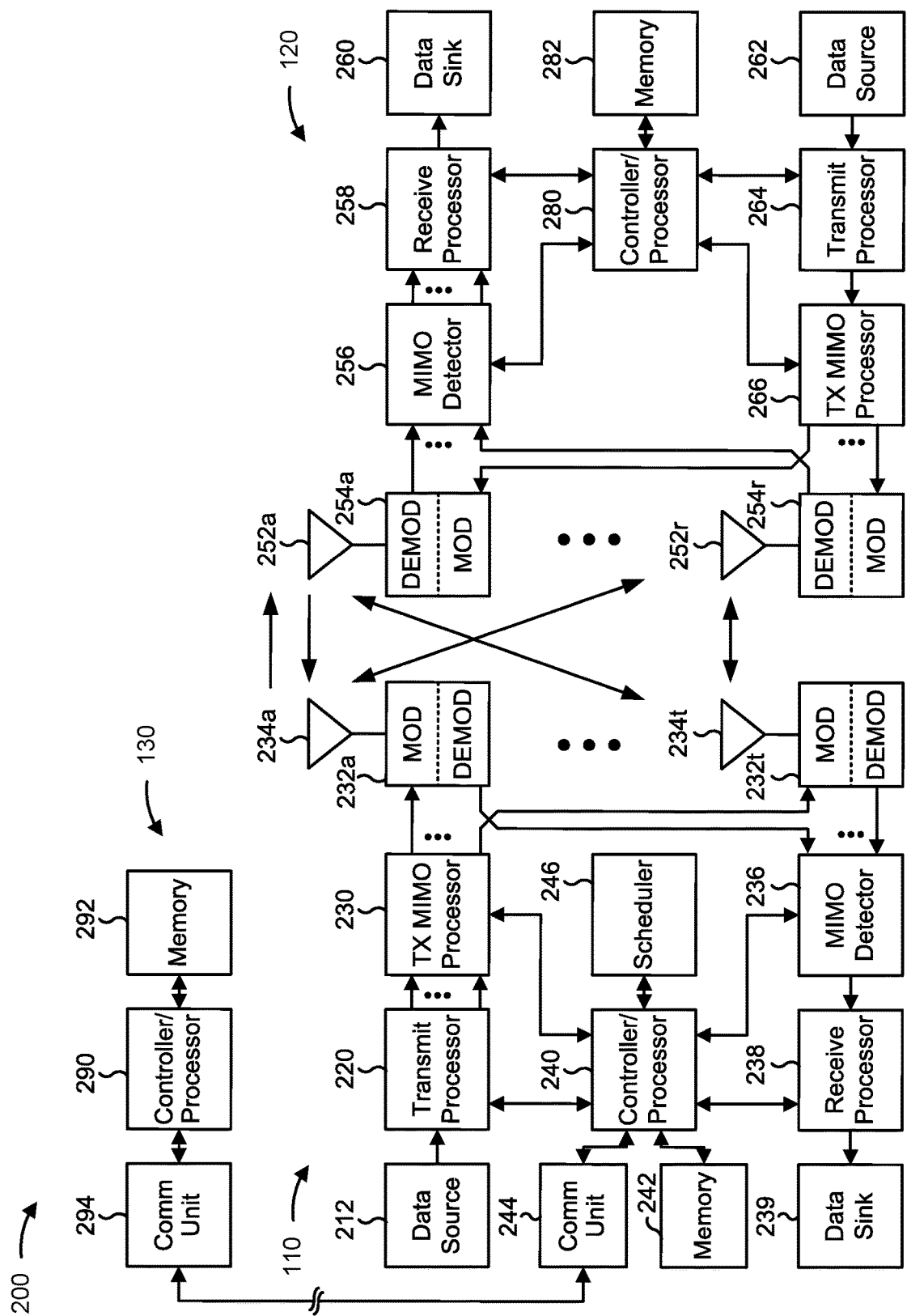
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with indicating sidelink connection loss, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 500 of FIG. 5, process 600 of FIG. 6, and/or other processes as described herein. A scheduler 246 may schedule UEs for data transmission on the downlink and/or uplink.

In some aspects, UE 120 may include means for transmitting a first message identifying a set of UEs comprising one or more other UEs with which the UE 120 is engaging in sidelink communication (e.g., using controller/processor 280, transmit processor 264, TX MIMO processor 266, MOD 254, antenna 252, and/or the like), means for transmitting a second message, based at least in part on a determination of a loss of a sidelink connection to a previously-connected UE of the set of UEs, identifying a subset of the set of UEs and indicating the loss of the sidelink connection (e.g., using controller/processor 280, transmit processor 264, TX MIMO processor 266, MOD 254, antenna 252, and/or the like), and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving, from a UE, a first message identifying a set of UEs comprising one or more other UEs with which the UE is engaging in sidelink communication (e.g., using antenna 234, DEMOD 232, MIMO detector 236, receive processor 238, controller/processor 240, and/or the like), means for receiving, from the UE, a second message identifying a subset of the set of UEs (e.g., using antenna 234, DEMOD 232, MIMO detector 236, receive processor 238, controller/processor 240, and/or the like), and means for identifying, based at least in part on the first message and the second message, a loss of a sidelink connection between the UE and a previously-connected UE of the set of UEs (e.g., using controller/processor 240 and/or the like), and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
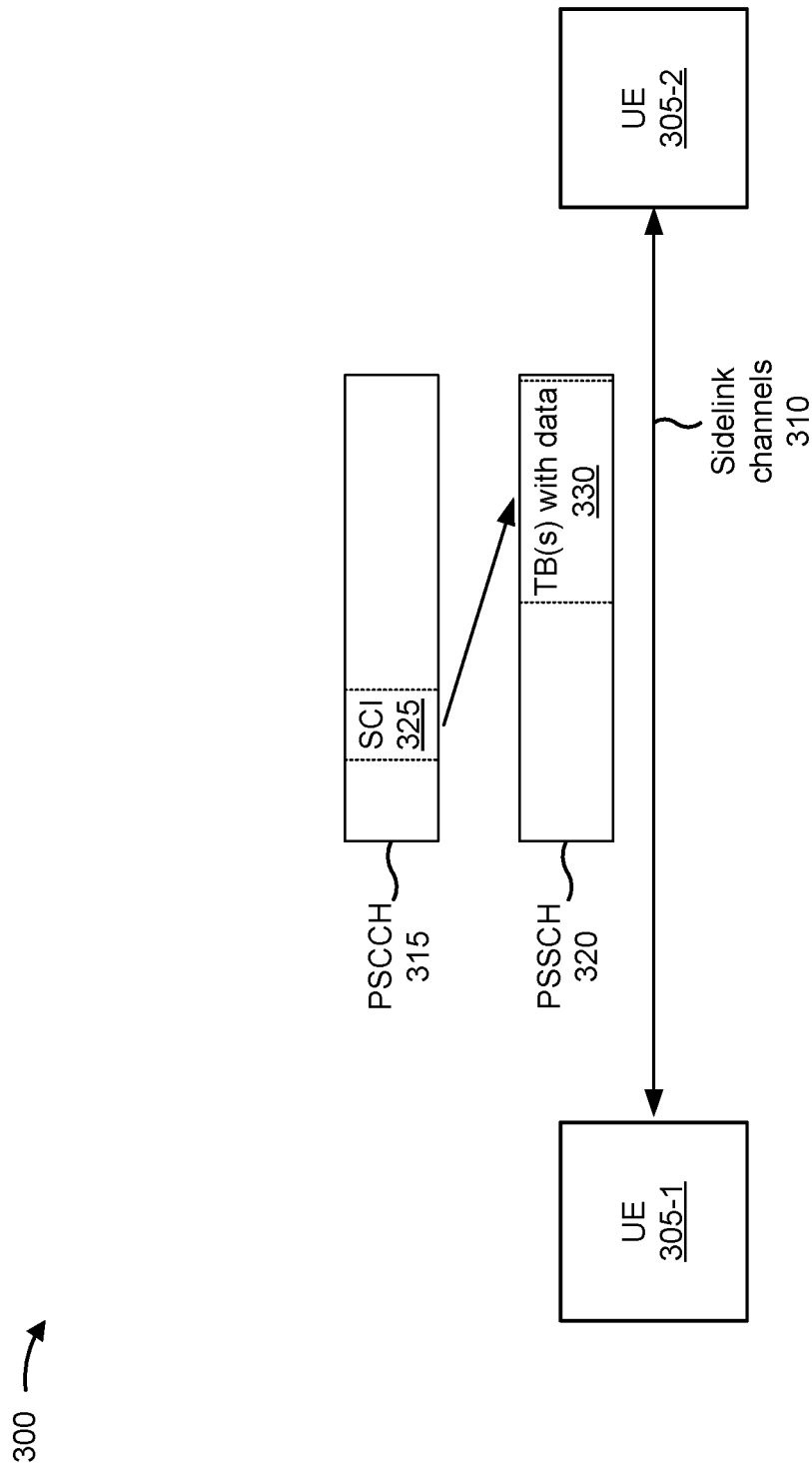
FIG. 3 is a block diagram illustrating an example of communications via a sidelink, in accordance with various aspects of the present disclosure.

FIG. 3 is a block diagram conceptually illustrating an example 300 of communications via a sidelink, in accordance with certain aspects of the present disclosure.

As shown in FIG. 3, a first UE 305-1 may communicate with a second UE 305-2 (and one or more other UEs 305) using device-to-device (D2D) communications via one or more sidelink channels 310. In some aspects, the UEs 305 may correspond to one or more other UEs described elsewhere herein, such as UE 120, and/or the like. In some aspects, the sidelink channel 310 may use a PC5 interface and/or may operate in a high frequency band (e.g., the 5.9 GHz band). Additionally, or alternatively, the UEs 305 may synchronize timing of transmission time intervals (e.g., frames, subframes, slots, and/or the like) using global navigation satellite system (GNSS) timing. The UEs 305 may transmit communications (e.g., one-to-many broadcasts and/or multicast transmissions) using the sidelink channel 310.

As further shown in FIG. 3, the sidelink channel 310 may include a physical sidelink control channel (PSCCH) 315 and a physical sidelink shared channel (PSSCH) 320. The PSCCH 315 may be used to communicate control information, similar to a physical downlink control channel (PDCCH) and/or a physical uplink control channel (PUCCH) used for communications with a base station 110. The PSSCH 320 may be used to communicate data, similar to a physical downlink shared channel (PDSCH) and/or a physical uplink shared channel (PUSCH) used for communications with a base station 110. For example, the PSCCH 315 may carry sidelink control information (SCI) 325, which may indicate various control information used for sidelink communications, such as one or more resources (e.g., time and/or frequency resources) where a transport block (TB) 330 that includes data is carried on the PSSCH 320. In some cases, the TB 330 may include vehicle-to-everything (V2X) data, such as a basic safety message (BSM), a traffic information message (TIM), a signal phase and time (SPAT) message, a MAP message to convey geographic road information, a cooperative awareness message (CAM), a distributed environment notification message (DENM), an in-vehicle information (IVI) message, and/or the like.

In some aspects, the sidelink channel 310 may use resource pools. For example, a scheduling assignment (e.g., included in SCI 325) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate in transmission mode 1 or transmission mode 3, where resource selection and/or scheduling is performed by a base station 110. In some aspects, a UE 305 may operate in transmission mode 2 or transmission mode 4, where resource selection and/or scheduling is performed by the UE 305 (e.g., rather than by a base station).

In sidelink communications, conditions of the sidelink channel 310 used to carry the communications may vary widely and change quickly due to the high mobility of the UEs 305 (e.g., UEs associated with vehicles), large variations in UE activity at different times of day and in different locations, a wide variety of topographies that the UEs 305 may traverse (e.g., dense urban environments, hilly environments, flat environments, and/or the like), and/or the like. As a result, the first UE 305-1 and the second UE 305-2 may lose a connection that is supported by the sidelink channel 310. However, according to current sidelink communication, a UE 305 may not be enabled to report the lost connection to a base station, which may be useful in transmission mode 1 to permit the base station to perform resource allocation, or re-allocation, based at least in part on the lost connection.

Some techniques and apparatuses described herein enable a UE 305 to provide an indication of a lost sidelink connection to a base station. For example, the UE 305 may transmit a first message that identifies a set of UEs with which the UE 305 is engaging in sidelink communication. Thereafter, and based on determining a loss of a sidelink connection with a UE of the set of UEs, the UE 305 may transmit a second message that identifies a subset of the set of UEs, where the subset does not include the UE with which the connection was lost. In this way, the base station may identify the lost connection based at least in part on the first message and the second message, and thereby allocate resources for sidelink communication with improved efficiency.

As indicated above, FIG. 3 is provided merely as an example. Other examples may differ from what is described with regard to FIG. 3.

Figure 4:
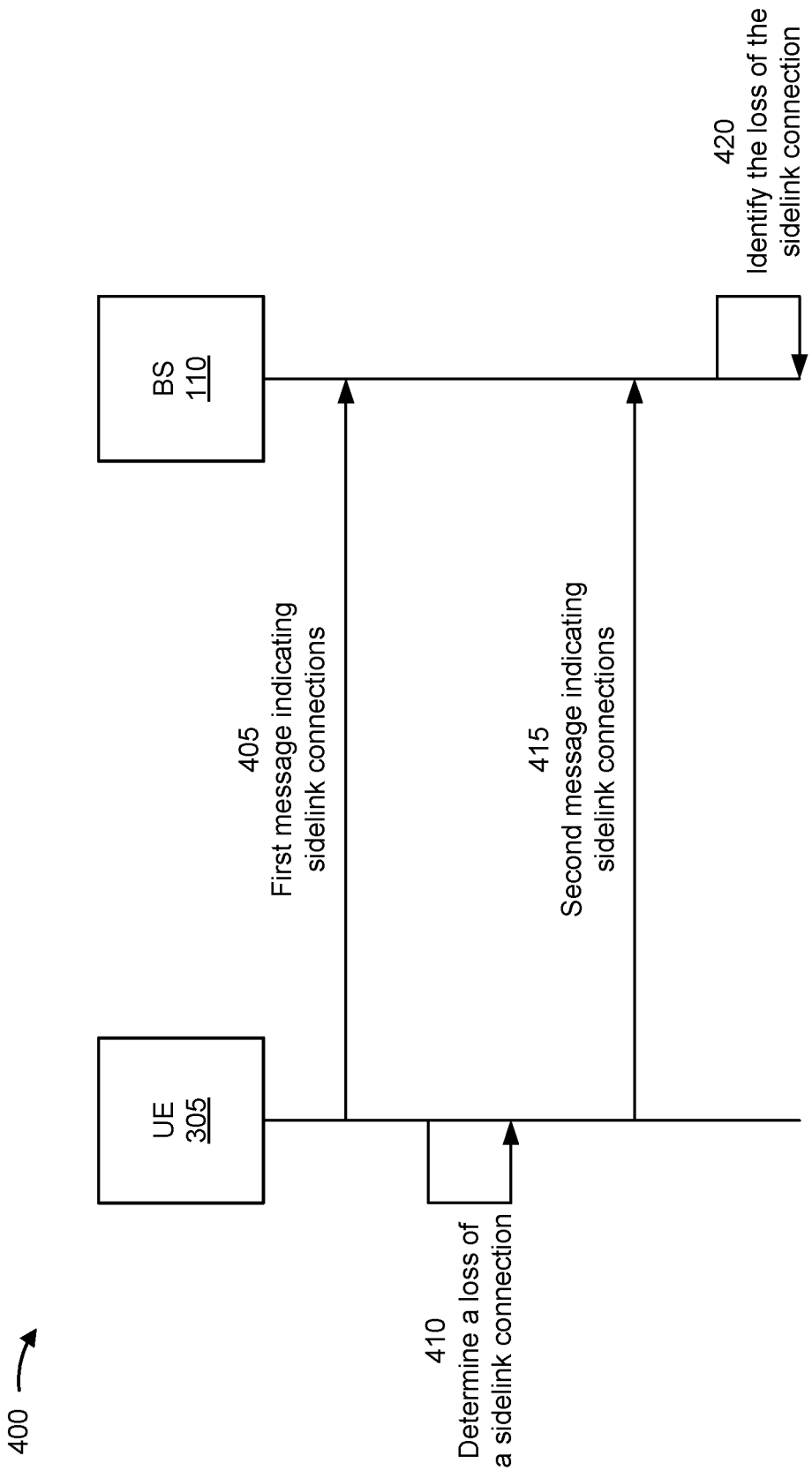
FIG. 4 is a diagram illustrating an example of indicating sidelink connection loss, in accordance with various aspects of the present disclosure.

FIG. 4 is a diagram illustrating an example 400 of indicating sidelink connection loss, in accordance with various aspects of the present disclosure. As shown in FIG. 4, a UE 305 may communicate with a BS 110 to indicate sidelink connection loss. The UE 305 may correspond to one or more UEs described elsewhere herein, such as UE 120, and/or the like. The UE 305 may be engaged in sidelink communications with a set of UEs that includes one or more other UEs (e.g., one or more UEs 120, UEs 305, and/or the like), as described above in connection with FIG. 3. In some cases, the set of UEs may include a plurality of other UEs (e.g., two or more other UEs).

In some aspects, the sidelink communications may be in accordance with a transmission mode in which resource selection and/or scheduling is performed by the BS 110. For example, the sidelink communications may be in accordance with transmission mode 1 or transmission mode 3. Accordingly, the BS 110 may allocate resources for the sidelink communications of the UE 305.

As shown in FIG. 4, and by reference number 405, the UE 305 may transmit, and the BS 110 may receive, a first message that identifies current (e.g., at a time of transmitting the first message) sidelink connections of the UE 305. For example, the first message may identify the set of UEs with which the UE 305 is engaged in sidelink communication. In some aspects, the BS 110 may store information associated with the set of UEs for later comparison, as described below.

In some aspects, the UE 305 may transmit the first message to the BS 110 via radio resource control (RRC) signaling. That is, the first message may be an RRC message. For example, the first message may be a sidelink UE information message. A sidelink UE information message may be used in current sidelink communication to indicate sidelink parameters and/or request resources for sidelink communication.

In some aspects, the UE 305 may identify the set of UEs in a first field of the first message. For example, the first field of the first message may be a destination information list field of a UE information message. The first field (e.g., a destination information list field) may permit identification of the UEs of the set of UEs (e.g., up to 16 UEs) by respective identifiers (e.g., layer 2 identifiers). In addition, the first field may also identify corresponding sidelink communication types (e.g., unicast, broadcast, groupcast, and/or the like) for the UEs of the set of UEs.

In some aspects, the first message may identify an event that triggered transmission of the first message. For example, the first message may identify the event that triggered transmission of the first message in a second field of the first message. The second field of the first message may be a destination update field of the sidelink UE information message. The second field (e.g., a destination update field) may indicate whether a lost sidelink connection triggered transmission of the first message, as described below. Accordingly, in the first message, the second field may indicate that the transmission of the first message was not triggered by a lost sidelink connection.

As shown by reference number 410, the UE 305 may determine a loss of a sidelink connection with a previously-connected UE of the set of UEs identified by the first message. For example, in some cases, the UE 305 may cause a disconnection of the sidelink connection with the previously-connected UE of the set of UEs. In such a case, the UE 305 may determine the loss of the sidelink connection based at least in part on causing the disconnection of the sidelink connection with the previously-connected UE of the set of UEs. In some aspects, the UE 305 may cause disconnection of sidelink connections with multiple previously-connected UEs of the set of UEs.

In some other cases, the UE 305 may monitor sidelink connections with UEs of the set of UEs in order to determine a radio link failure (RLF), which may indicate a loss of a sidelink connection with a previously-connected UE of the set of UEs. For example, the UE 305 may implement a timer to detect an RLF for a sidelink connection. As an example, the UE 305 may detect a problem with a sidelink connection, based at least in part on receiving a first threshold quantity of consecutive out-of-sync indications for the sidelink connection, and may start a timer. The UE 305 may stop the timer if the UE 305 subsequently receives a second threshold quantity of in-sync indications. Otherwise, if the timer expires, the UE 305 may determine an RLF for the sidelink connection, and thereby determine a loss of the sidelink connection with the previously-connected UE of the set of UEs. In some aspects, the UE 305 may determine RLFs of sidelink connections with multiple previously-connected UEs of the set of UEs.

As shown by reference number 415, the UE 305 may transmit, and the BS 110 may receive, a second message that identifies current (e.g., at a time of transmitting the second message) sidelink connections of the UE 305, as described above. The UE 305 may transmit the second message based at least in part on a determination of a loss of a sidelink connection (e.g., due to a disconnection or an RLF) with a previously-connected UE of the set of UEs (or multiple previously-connected UEs of the set of UEs). That is, the UE 305 may transmit the second message upon determining a loss of a sidelink connection with the previously-connected UE of the set of UEs.

The second message may identify a subset of the set of UEs identified in the first message (as well as any new UEs with which the UE 305 has initiated sidelink communication since the first message). In some aspects, the subset may include a lesser quantity of UEs than was included in the set of UEs. For example, the subset may include zero or more of the UEs included in the set of UEs. In some cases, the subset may not include a previously-connected UE (or multiple previously-connected UEs) with which the UE 305 has determined a lost sidelink connection (e.g., due to a disconnection or an RLF).

The second message may be an RRC message, such as a sidelink UE information message, as described above. Accordingly, a first field (e.g., a destination information list field) of the second message may identify the subset of the set of UEs, as described above. In some cases, a second field (e.g., a destination update field) of the second message may identify an event that triggered transmission of the second message. For example, the second field may identify that a loss of a sidelink connection triggered transmission of the second message. Moreover, the second field may indicate whether the lost sidelink connection is due to an RLF or a disconnection. As an example, a first bit value of the second field (e.g., a destination update field) may be used to indicate that the lost sidelink connection is due to an RLF, and a second bit value of the second field (e.g., a destination update field) may be used to indicate that the lost sidelink connection is due to a disconnection.

As shown by reference number 420, the BS 110 may identify a lost sidelink connection between the UE 305 and a previously-connected UE (or multiple previously-connected UEs) of the set of UEs identified by the first message. The BS 110 may identify the lost sidelink connection based at least in part on the first message and the second message. For example, the BS 110 may compare the set of UEs identified by the first message to the subset of the set of UEs identified by the second message (e.g., the BS 110 may determine a difference between the set and the subset). Based on the comparison, the BS 110 may identify a previously-connected UE (or multiple previously-connected UEs) that was included in the set of UEs of the first message and not included in the subset of the set of UEs in the second message, to thereby identify that the UE 305 lost a sidelink connection with the previously-connected UE. Moreover, the BS 110 may identify whether the lost sidelink connection was due to an RLF or a disconnection based at least in part on a value of the second field (e.g., a destination update field) of the second message.

In some aspects, the BS 110 may perform one or more actions based at least in part on identifying the lost sidelink connection between the UE 305 and the previously-connected UE. For example, the BS 110 may determine an allocation, or re-allocation, of resources for the UE 305 based at least in part on identifying the lost sidelink connection. As an example, the BS 110 may determine that one or more resources allocated for sidelink communications between the UE 305 and the previously-connected UE are to be used by the UE 305 to transmit a communication to a UE of the subset of the set of UEs (or another UE), receive a communication from a UE of the subset of the set of UEs (or another UE), and/or the like. As another example, the BS 110 may determine that one or more resources allocated for sidelink communications between the UE 305 and the previously-connected UE are to be de-allocated and reassigned. In this way, the BS 110 may allocate resources with improved efficiency based at least in part on identification of the lost sidelink connection.

In some aspects, the BS 110 may transmit, and the UE 305 may receive, a configuration that identifies one or more resources that the UE 305 is to use for sidelink communications with UEs of the subset of the set of UEs. For example, the BS 110 may transmit the configuration based at least in part on identifying the lost sidelink connection. The configuration may identify the one or more resources according to the allocation, or re-allocation, determined by the BS 110.

As indicated above, FIG. 4 is provided as an example. Other examples may differ from what is described with respect to FIG. 4.

Figure 5:
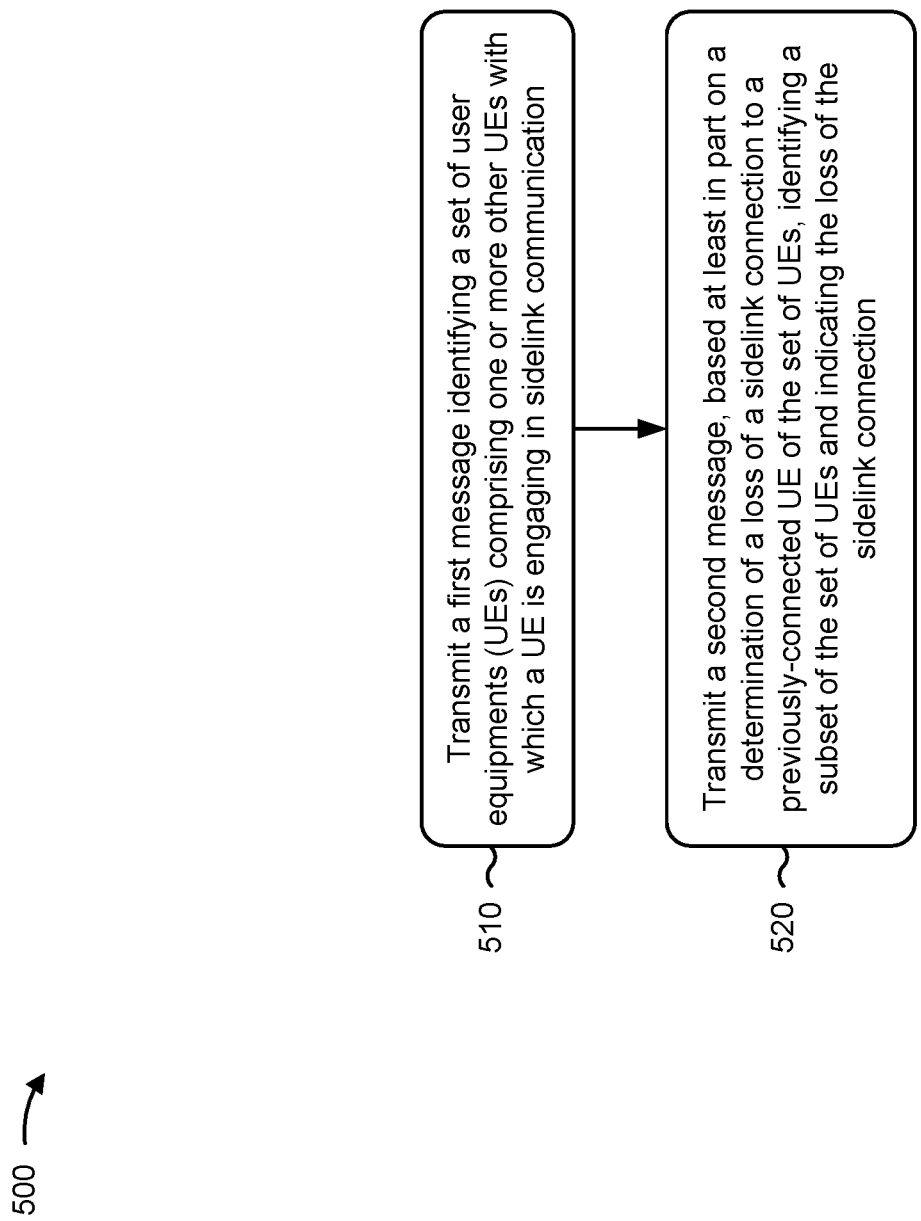
FIG. 5 is a diagram illustrating an example process performed, for example, by a UE, in accordance with various aspects of the present disclosure.

FIG. 5 is a diagram illustrating an example process 500 performed, for example, by a UE, in accordance with various aspects of the present disclosure. Example process 500 is an example where a UE (e.g., UE 120, UE 305, and/or the like) performs operations associated with indicating sidelink connection loss.

As shown in FIG. 5, in some aspects, process 500 may include transmitting a first message identifying a set of UEs comprising one or more other UEs with which a UE is engaging in sidelink communication (block 510). For example, the UE (e.g., using controller/processor 280, transmit processor 264, TX MIMO processor 266, MOD 254, antenna 252, and/or the like) may transmit a first message identifying a set of UEs comprising one or more other UEs with which the UE is engaging in sidelink communication, as described above, for example, with reference to FIG. 4.

As further shown in FIG. 5, in some aspects, process 500 may include transmitting a second message, based at least in part on a determination of a loss of a sidelink connection to a previously-connected UE of the set of UEs, identifying a subset of the set of UEs and indicating the loss of the sidelink connection (block 520). For example, the UE (e.g., using controller/processor 280, transmit processor 264, TX MIMO processor 266, MOD 254, antenna 252, and/or the like) may transmit a second message, based at least in part on a determination of a loss of a sidelink connection to a previously-connected UE of the set of UEs, identifying a subset of the set of UEs and indicating the loss of the sidelink connection, as described above, for example, with reference to FIG. 4.

Process 500 may include additional aspects, such as any single aspect or any combination of aspects described below and/or in connection with one or more other processes described elsewhere herein.

In a first aspect, the loss of the sidelink connection is caused by a radio link failure of the sidelink connection or a disconnection of the sidelink connection.

In a second aspect, alone or in combination with the first aspect, the second message provides an indication that the second message relates to the loss of the sidelink connection. In a third aspect, alone or in combination with one or more of the first and second aspects, the indication indicates that the loss of the sidelink connection is a radio link failure of the sidelink connection or a disconnection of the sidelink connection.

In a fourth aspect, alone or in combination with one or more of the first through third aspects, the set of UEs are identified by respective layer 2 identifiers. In a fifth aspect, alone or in combination with one or more of the first through fourth aspects, the set of UEs includes more than one other UE.

In a sixth aspect, alone or in combination with one or more of the first through fifth aspects, the first message and the second message are transmitted by radio resource control signaling. In a seventh aspect, alone or in combination with one or more of the first through sixth aspects, the first message and the second message are sidelink UE information messages. In an eighth aspect, alone or in combination with one or more of the first through seventh aspects, the set of UEs is identified in a destination information list field of the first message, and the subset is identified in a destination information list field of the second message.

In a ninth aspect, alone or in combination with one or more of the first through eighth aspects, process 500 further includes receiving, based at least in part on transmitting the second message, a configuration that identifies one or more resources that the UE is to use for sidelink communication.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a diagram illustrating an example process 600 performed, for example, by a base station, in accordance with various aspects of the present disclosure. Example process 600 is an example where a base station (e.g., BS 110 and/or the like) performs operations associated with indicating sidelink connection loss.

As shown in FIG. 6, in some aspects, process 600 may include receiving, from a UE, a first message identifying a set of UEs comprising one or more other UEs with which the UE is engaging in sidelink communication (block 610). For example, the base station (e.g., using antenna 234, DEMOD 232, MIMO detector 236, receive processor 238, controller/processor 240, and/or the like) may receive, from a UE, a first message identifying a set of UEs comprising one or more other UEs with which the UE is engaging in sidelink communication, as described above, for example, with reference to FIG. 4.

As further shown in FIG. 6, in some aspects, process 600 may include receiving, from the UE, a second message identifying a subset of the set of UEs (block 620). For example, the base station (e.g., using antenna 234, DEMOD 232, MIMO detector 236, receive processor 238, controller/processor 240, and/or the like) may receive, from the UE, a second message identifying a subset of the set of UEs, as described above, for example, with reference to FIG. 4.

As further shown in FIG. 6, in some aspects, process 600 may include identifying, based at least in part on the first message and the second message, a loss of a sidelink connection between the UE and a previously-connected UE of the set of UEs (block 630). For example, the base station (e.g., using controller/processor 240 and/or the like) may identify, based at least in part on the first message and the second message, a loss of a sidelink connection between the UE and a previously-connected UE of the set of UEs, as described above, for example, with reference to FIG. 4.

Process 600 may include additional aspects, such as any single aspect or any combination of aspects described below and/or in connection with one or more other processes described elsewhere herein.

In a first aspect, the loss of the sidelink connection is caused by a radio link failure of the sidelink connection or a disconnection of the sidelink connection.

In a second aspect, alone or in combination with the first aspect, the second message provides an indication that the second message relates to the loss of the sidelink connection. In a third aspect, alone or in combination with one or more of the first and second aspects, the indication indicates that the loss of the sidelink connection is a radio link failure of the sidelink connection or a disconnection of the sidelink connection.

In a fourth aspect, alone or in combination with one or more of the first through third aspects, the set of UEs are identified by respective layer 2 identifiers. In a fifth aspect, alone or in combination with one or more of the first through fourth aspects, the set of UEs includes more than one other UE.

In a sixth aspect, alone or in combination with one or more of the first through fifth aspects, the first message and the second message are received by radio resource control signaling. In a seventh aspect, alone or in combination with one or more of the first through sixth aspects, the first message and the second message are sidelink UE information messages. In an eighth aspect, alone or in combination with one or more of the first through seventh aspects, the set of UEs is identified in a destination information list field of the first message, and the subset is identified in a destination information list field of the second message.

In a ninth aspect, alone or in combination with one or more of the first through eighth aspects, process 600 further includes transmitting, based at least in part on identifying the loss of the sidelink connection, a configuration that identifies one or more resources that the UE is to use for sidelink communication.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    transmitting a first message identifying a set of UEs with which the UE is engaged in sidelink communication; and
    transmitting a second message, based at least in part on a loss of a sidelink connection to at least one UE of the set of UEs, identifying one or more other UEs currently connected to the UE via sidelink and indicating the loss of the sidelink connection, the second message further indicating a type of loss associated with the loss of the sidelink connection.

2. The method of claim 1, wherein the loss of the sidelink connection is caused by a radio link failure of the sidelink connection or a disconnection of the sidelink connection.

3. The method of claim 1, wherein the second message indicates whether the loss of the sidelink connection is a radio link failure of the sidelink connection or a disconnection of the sidelink connection.

4. The method of claim 1, wherein the set of UEs are identified by respective layer 2 identifiers.

5. The method of claim 1, wherein the set of UEs includes more than one other UE.

6. The method of claim 1, wherein the first message and the second message are transmitted by radio resource control signaling.

7. The method of claim 1, wherein the first message and the second message are sidelink UE information messages.

8. The method of claim 1, wherein the set of UEs is identified in a destination information list field of the first message, and
    wherein the one or more other UEs are identified in a destination information list field of the second message.

9. The method of claim 1, further comprising receiving, based at least in part on transmitting the second message, a configuration that identifies one or more resources that the UE is to use for sidelink communication.

10. A method of wireless communication performed by a network entity, comprising:
    receiving, from a user equipment (UE), a first message identifying a set of UEs with which the UE is engaged in sidelink communication; and
    receiving, from the UE, a second message identifying one or more other UEs currently connected to the UE via sidelink and indicating a loss of sidelink connection with at least one UE of the set of UEs, the second message further indicating a type of loss associated with the loss of the sidelink connection.

11. The method of claim 10, wherein second message indicates whether the loss of the sidelink connection was caused by a radio link failure of the sidelink connection or a disconnection of the sidelink connection.

12. The method of claim 10, wherein the set of UEs are identified by respective layer 2 identifiers.

13. The method of claim 10, wherein the set of UEs includes more than one other UE.

14. The method of claim 10, wherein the first message and the second message are received by radio resource control signaling.

15. The method of claim 10, wherein the first message and the second message are sidelink UE information messages.

16. The method of claim 10, wherein the set of UEs is identified in a destination information list field of the first message, and wherein the one or more other UEs are identified in a destination information list field of the second message.

17. The method of claim 10, further comprising transmitting, based at least in part on receiving the second message, a configuration that identifies one or more resources that the UE is to use for sidelink communication.

18. A user equipment (UE) for wireless communication, comprising:

one or more memories; and one or more processors coupled to the one or more memories, the one or more processors configured to cause the UE to:

transmit a first message identifying a set of UEs with which the UE is engaged in sidelink communication; and transmit a second message, based at least in part on a loss of a sidelink connection to at least one UE of the set of UEs, identifying one or more other UEs currently connected to the UE via sidelink and indicating the loss of the sidelink connection, the second message further indicating a type of loss associated with the loss of the sidelink connection.

19. The UE of claim 18, wherein the second message indicates whether the loss of the sidelink connection is a radio link failure of the sidelink connection or a disconnection of the sidelink connection.

20. The UE of claim 18, wherein the first message and the second message are sidelink UE information messages.

21. The UE of claim 18, wherein the set of UEs is identified in a destination information list field of the first message, and wherein the one or more other UEs are identified in a destination information list field of the second message.

22. A network entity for wireless communication, comprising:

one or more memories; and one or more processors coupled to the one or more memories, the one or more processors configured to cause the network entity to:

receive, from a user equipment (UE), a first message identifying a set of UEs with which the UE is engaged in sidelink communication; and receive, from the UE, a second message identifying one or more other UEs currently connected to the UE via sidelink and indicating a loss of sidelink connection with at least one UE of the set of UEs, the second message further indicating a type of loss associated with the loss of the sidelink connection.

23. The network entity of claim 22, wherein the second message indicates whether the loss of the sidelink connection was caused by a radio link failure of the sidelink connection or a disconnection of the sidelink connection.

24. The network entity of claim 22, wherein the first message and the second message are sidelink UE information messages.

25. The network entity of claim 22, wherein the set of UEs is identified in a destination information list field of the first message, and wherein the at least one UE hone or more other UEs are identified in a destination information list field of the second message.

26. The UE of claim 18, wherein the set of UEs are identified by respective layer 2 identifiers.

27. The UE of claim 18, wherein the one or more processors, to transmit the first message and the second message, are configured to cause the UE to:

transmit the first message and the second message by radio resource control signaling.

28. The UE of claim 18, wherein the one or more processors are further configured to cause the UE to:

receive, based at least in part on the second message, a configuration that identifies one or more resources that the UE is to use for sidelink communication.

29. The network entity of claim 22, wherein the set of UEs are identified by respective layer 2 identifiers.

30. The network entity of claim 22, wherein the one or more processors are further configured to cause the UE to:

transmit, based at least in part on the second message, a configuration that identifies one or more resources that the UE is to use for sidelink communication.

* * * * *